United States Patent [19]
Weinberg et al.

[11] 4,291,409
[45] Sep. 22, 1981

[54] SPREAD SPECTRUM COMMUNICATIONS METHOD AND APPARATUS

[75] Inventors: Aaron Weinberg; Paul M. Ebert, both of Potomac; Joseph J. Fee, Wheaton, all of Md.; Yaroslav Kaminsky, Herndon, Va.; Feisal S. Keblawi, Vienna, Va.; Walter C. Scales, McLean, Va.

[73] Assignee: The Mitre Corporation, Bedford, Mass.

[21] Appl. No.: 925,847

[22] Filed: Jul. 18, 1978

Related U.S. Application Data

[63] Continuation of Ser. No. 917,290, Jun. 20, 1978, abandoned.

[51] Int. Cl.$^3$ .................... H04B 15/00; H04K 1/04
[52] U.S. Cl. ........................... 375/1; 455/12; 455/17; 375/44; 375/100
[58] Field of Search ............ 325/30, 32, 38, 42, 325/51, 65, 320, 321, 323, 473, 479, 13, 58; 179/15 BA, 15 AD, 15 AP; 364/724; 370/75, 97, 107; 343/100 CS, 100 SA, 854; 455/12, 13, 17, 23; 375/1, 2, 3, 4, 37, 38, 44, 100

[56] References Cited
U.S. PATENT DOCUMENTS

| | | | |
|---|---|---|---|
| 3,158,864 | 11/1964 | Lehan | 343/200 |
| 3,305,636 | 2/1967 | Webb | 178/67 |
| 3,350,644 | 10/1967 | McNair | 325/42 |
| 3,351,859 | 11/1967 | Groth, Jr. et al. | 325/42 |
| 3,432,619 | 3/1969 | Blasbalg | 179/15 |
| 3,478,268 | 11/1969 | Coviello | 325/65 |
| 3,610,828 | 10/1971 | Girard | 179/1.5 S |
| 3,665,472 | 5/1972 | Kartchner et al. | 343/175 |
| 3,669,447 | 10/1972 | Frost | 325/45 |
| 3,706,933 | 12/1972 | Bidell | 325/479 |
| 3,714,573 | 1/1973 | Grossman | 325/32 |
| 3,766,477 | 10/1973 | Cook | 325/30 |
| 3,806,815 | 4/1974 | Fletcher | 325/320 |
| 3,864,635 | 2/1975 | Ewanus | 325/421 |
| 3,934,203 | 1/1976 | Schiff | 325/65 |
| 4,017,798 | 4/1977 | Gordy et al. | 325/42 |
| 4,039,749 | 8/1977 | Gordy et al. | 178/69.1 |
| 4,041,391 | 8/1977 | Deerkoski | 325/30 |
| 4,112,372 | 9/1978 | Holmes et al. | 325/321 |

OTHER PUBLICATIONS

"Modulation Techniques for Multiple Access to a Hard Limiting Satellite Repeater", Aein et al., IEEE Proc., vol. 54, No. 5, pp. 763–777 (May, 1966).
Weinberg et al., "IEE Journal of Oceanic Engineering", vol. OE-2 #3, Jul. 1977, pp. 274–285.

Primary Examiner—Benedict V. Safourek
Attorney, Agent, or Firm—Kenway & Jenney

[57] ABSTRACT

A method and apparatus employing spread spectrum techniques in a wide bandwidth communications system is disclosed. A plurality of transmitting stations are each equipped to provide a transmission signal representing a pseudo-random coded, phase modulated, message signal. The transmission signal is directed through a bandwidth which encompasses otherwise dedicated, relatively narrow bandwidth repeater channels, employed in connection with a communications satellite, to a generally fixed receiver station. At the receiving station, the incoming signal is (a) code acquired and tracked, (b) carrier acquired and tracked, (c) phase locked to the receiver local oscillator and (d) coherently demodulated to extract the desired data. The receiving station advantageously employs plural receiving elements each having a pseudo-random sequence code matched filter which significantly reduces code acquisition time by obviating the necessity of exhaustively correlating the incoming signal with a replica of the pseudo-random code word at the receiver station.

23 Claims, 16 Drawing Figures

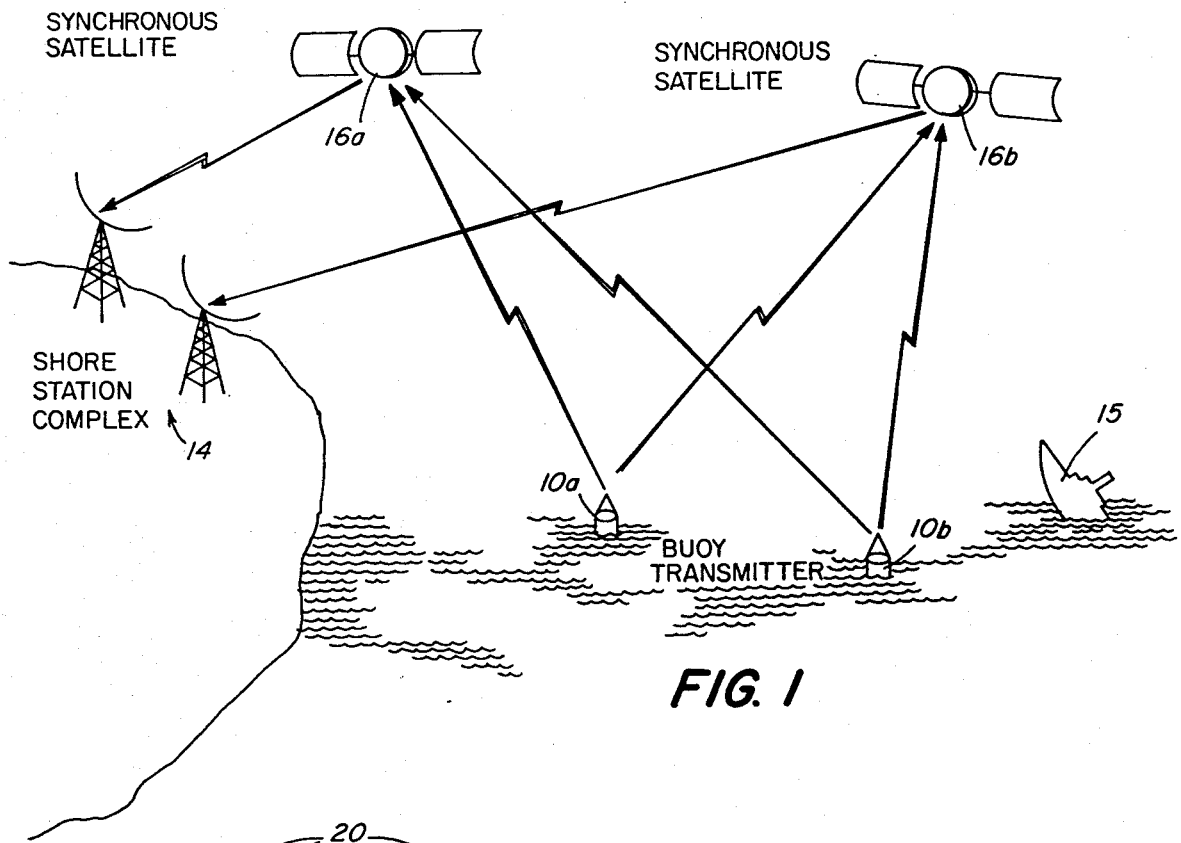
FIG. 1
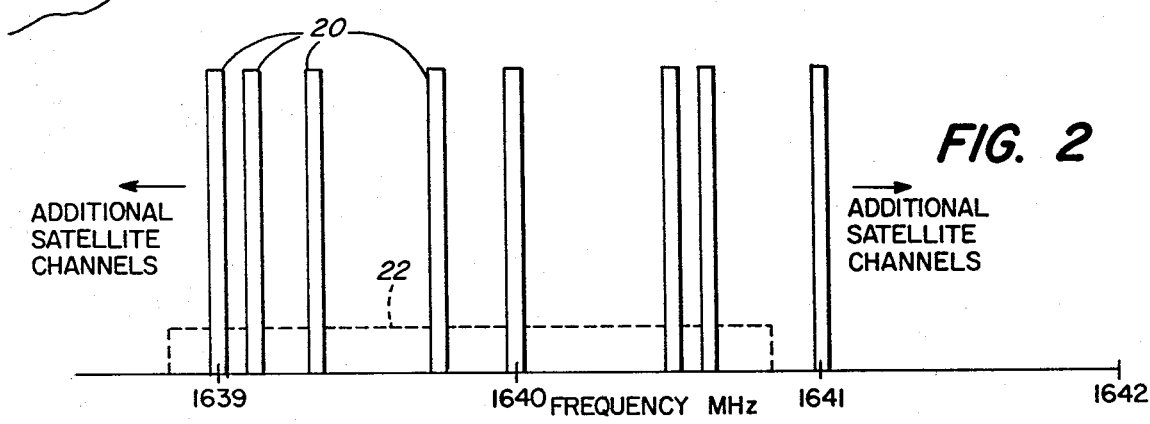
FIG. 2
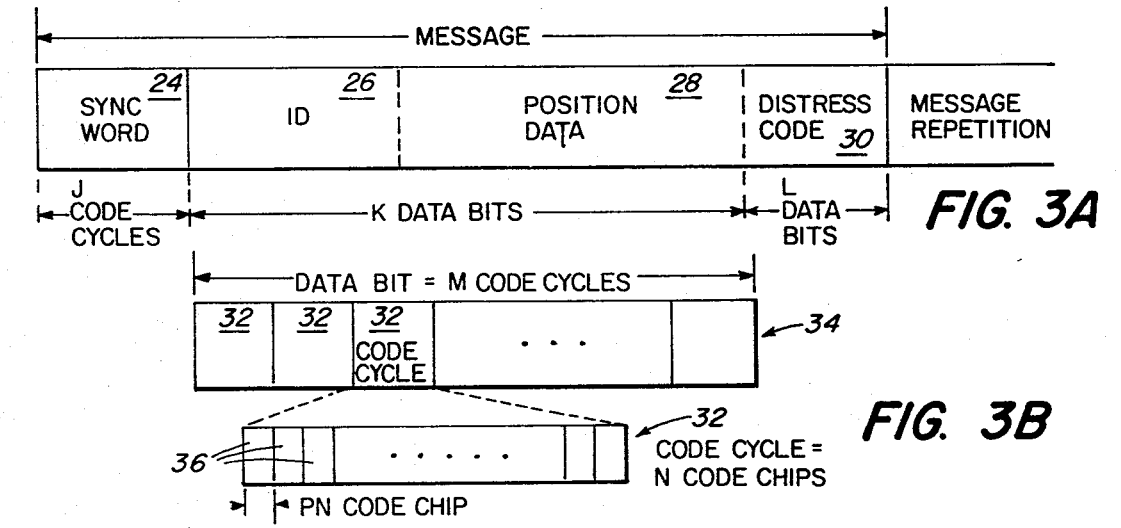
FIG. 3A
FIG. 3B

SPREAD SPECTRUM COMMUNICATIONS METHOD AND APPARATUS

CROSS-REFERENCE TO RELATED APPLICATIONS

This application is a continuation of our United States Application Ser. No. 917,290 filed on June 20, 1978, now abandoned.

This invention relates in general to spread spectrum communication systems and in particular to a spread spectrum communication system, for use in search and rescue applications, which has a simple transmitter configuration and a sophisticated receiver configuration.

Spread spectrum communication systems are well known in the art. The spread spectrum technique has been used in many applications, for example, in connection with anti-jamming systems. According to conventional spread spectrum systems, the message information is encoded to provide a transmission signal which is spread over a bandwidth or frequency spectrum that is wide relative to the message or information bandwidth. The transmission signal is passed through a selected wide band communications channel to a receiver at which the transmission signal timing is acquired and tracked and the message information is thereafter recovered.

Spread spectrum systems typically incorporate pseudo-random noise generators at the transmitter for generating, for example, a phase modulated, spread spectrum signal. Corresponding pseudo-random noise generators are then employed at the receiver and are synchronized to the transmitter pseudo-random noise generator for coherent detection of the message signal. Some spread spectrum systems employ plural pseudo-random noise generators at both the transmitter and receiver.

The primary purpose of employing a pseudo-random noise generator (as opposed, for example, to a random noise generator) at the transmitting and receiving stations is to provide a low-level transmission signal which can be reliably correlated with an internally generated receiver pseudo-random noise signal to improve signal to noise ratio of the system and to increase system reliability. Once the incoming spread spectrum signal has been detected and identified, various techniques have been employed, according to the literature, for recovering the message data. Unfortunately, these systems may have unacceptably long acquisition times under high noise conditions.

Further, according to the prior art, the typical concept of a spread spectrum communication system has been to transmit the spread spectrum wide bandwidth signal over a broad bandwidth channel and to recover it from or pick it out of the noise existing in the channel. The channels generally used typically include a broad bandwidth portion of the radio frequency spectrum for example in the microwave range.

The present invention pertains in particular to the application of spread spectrum techniques for maintaining reliable communications with plural low power transmitting stations positioned in diverse geographical regions. In particular, in connection with marine search and rescue operations, NASA has been studying different apparatus which use low orbiting satellites, such as TIROS, to enhance the capability of the marine search and rescue system to determine the position of a distress transmitter. Generally, the techniques employed by prior art systems include Doppler shifts and the use of multiple satellites to determine the position of a distress transmitter. These systems have met with a limited success because of the discontinuity of visibility of low orbiting satellites and the impracticality of requiring multiple satellites to be visible from any given region at all times. (It is preferable, with respect to multiple satellites, to have three satellites within view of the distress transmitter at all times.)

It is therefore an object of this invention to provide a spread spectrum apparatus and method which does not require a dedicated channel, and which has significantly decreased signal processing time, thus increasing the speed with which a distress transmitter can be acquired. Other objects of the invention include the provision of inexpensive low power transmitters, a reliable data acquiring receiver station, and the use of geosynchronous orbiting satellites in connection with marine search and rescue applications.

SUMMARY OF THE INVENTION

The method and apparatus of the invention relate to a spread spectrum communications system. The apparatus according to the invention features a transmitting element and a receiver station. The transmitting element has circuit elements for repetitively generating a binary message signal from the sequence of binary input data and a modulation element for generating from the message signal a spread spectrum transmission signal. The transmission signal is adapted to be transmitted as a pseudo-noise signal over a bandwidth otherwise used by a plurality of relatively narrow bandwidth repeater channels, each channel being dedicated to receiving and retransmitting communications signals unrelated to the spread spectrum signal. The receiving station receives the spread spectrum transmission signal, as retransmitted through the channels, and reconstructs the input data from the received retransmitted transmission signal. Preferably, the transmitting element is adapted to generate a spread spectrum signal for transmission through a wideband satellite communications system, the satellite system being otherwise dedicated to use with a plurality of relatively narrow bandwidth channels.

The generating circuitry according to the invention features means for repeatedly generating at a first bit rate, a selected pseudo-random code binary signal having a selected length, the first bit rate and the selected length defining a code word cycle time. The generating circuitry further features means for generating at a second bit rate, a synchronization identification word binary signal and at a third bit rate, the sequence of binary input data. The first bit rate divided by the selected length is an integer multiple of the second bit rate and of the third bit rate. The generating circuitry further combines the code signal, the synchronization signal, and the data sequence to form a repeating binary message signal. The modulating means thereby has circuitry for modulating a constant frequency carrier wave with the message signal to generate the spread spectrum transmission signal.

The receiving station, according to the invention, features at least one and preferably plural receiver elements. Each receiver element is substantially identical and comprises means for forming first and second quadrature component signals of the received signal at a selected carrier frequency, and a first and a second pseudo-random code matched filter, each filter being responsive respectively to said first and second component signals and being matched to the selected pseudo-random code signal. There is further featured incoherent detection means responsive to outputs of the filters for providing an output signal representing the degree of correlation of the received signal and the selected pseudo-random code signal.

The detection means has a code cycle accumulator for separately accumulating the sum of the squared value of the outputs of the code matched filters at each of a plurality of periodically occurring sample times over the code period and means for resetting the stored contents of the accumulator in response to the occurrence of the first of (a) a selected sampling time or (b) an accumulated stored contents greater than a first threshold value. Preferably, the periodically occurring sample times correspond to one-half the time duration between pseudo-random code bit occurrences. The number of accumulator storage elements in this preferred configuration is equal to twice the number of pseudo-random code bit occurrences in a code cycle. Means responsive to the accumulator output select a repeating clock pulse time position corresponding to a repeating accumulator output greater than the first threshold and synchronized to a detected pseudo-random code modulated received signal.

Each receiver element further features a variable clock source of first clock signals, means for generating a clock update signal, the clock update signal generating means having means for sampling the output of the accumulator at plural clock times centered around the repeating clock pulse and for providing a difference output signal equal to the difference of each two sampled accumulator outputs. The difference output signal is filtered and the variable clock source is responsive to the output of the filtering for varying the frequency of the clock source for producing a selected difference. The output of the clock source controls timing of a tapped charge transfer device or equivalent delay device which in part implements the code matched filter.

The outputs of the code matched filters, after the code has been acquired and tracked, are provided to one or more synchronization word and/or data word matched filters. The receiver then features means responsive to the code and data word matched filter outputs for accurately determining the frequency of the transmission signal carrier.

The receiving method used in the spread spectrum system, wherein the transmitted message has plural message bits synchronously combined with a repeating pseudo-random code sequence of higher bit rate, features the steps of forming first and second quadrature component signal of the received signal at at least one selected carrier frequency; for each pair of quadrature signals, passing each quadrature component through a pseudo-random code matched filter, each filter being matched to the selected pseudo-random code signal; and processing the filter outputs to provide data output signals representing the message.

In a preferred aspect of the invention, the method further features the steps of acquiring and tracking the pseudo-random code signal, coherently detecting, at each of a plurality of first frequencies, a plurality of short sequences of the message signal and accumulating the incoherently summed outputs at each first frequency as a function of time; selecting from the accumulation of incoherently summed outputs a selected first frequency; coherently detecting up to an entire message at each of a plurality of closely spaced second frequencies, the second frequencies being more closely spaced than the first frequencies and being centered around the selected first frequency; combining and accumulating the outputs at the second frequencies; selecting from the accumulation of second coherent outputs a selected second frequency; wherein said selected first and second frequencies are increasingly accurate approximations of the transmission signal carrier frequency.

The method further features, in the preferred aspect, the steps of activating an automatic frequency control loop for a more precise selected carrier frequency than achieved by the first and second selected frequencies, and activating a Costas loop filter for locking a voltage control oscillator in phase and frequency with the received carrier frequency.

In another aspect, in connection with a spread spectrum system wherein the transmitted message comprises plural message bits synchronously combined with a repeating pseudo-random code sequence, the receiving method comprises the steps of non-coherently acquiring and tracking the pseudo-random code sequence, and thereafter acquiring and tracking the transmitted carrier frequency and phase.

DESCRIPTION OF THE DRAWINGS

Other objects, features, and advantages of the invention will appear from the following description of a preferred embodiment taken together with the drawings in which:

FIG. 1 is a schematic representation of a preferred application of the invention;

FIG. 2 is a typical schematic functional representation of the frequency spectrum of a satellite system and a spread spectrum transmission signal according to the preferred embodiment of the invention;

FIG. 3A is a schematic representation of a typical transmission message structure according to the preferred embodiment of the invention;

FIG. 3B is a schematic representation of the data bit and code sequence structure according to the preferred embodiment of the invention;

DESCRIPTION OF A PREFERRED EMBODIMENT

Figure 4:
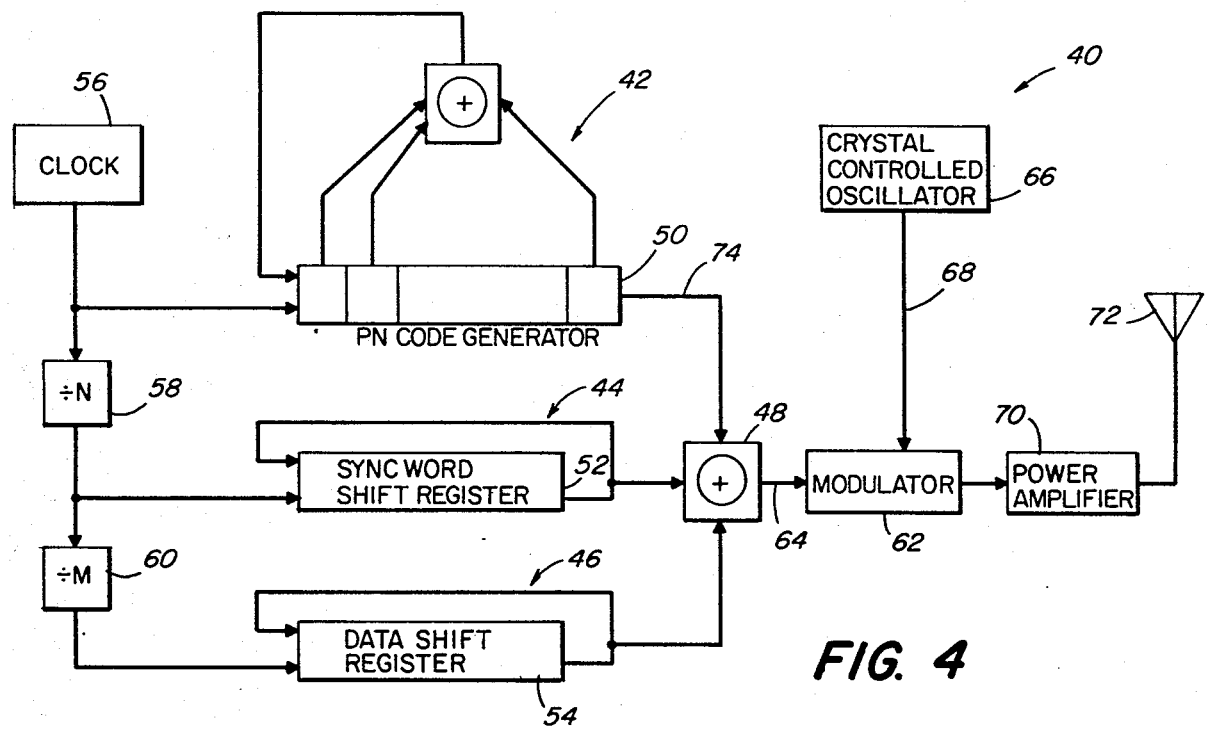
FIG. 4 is a schematic block diagram of a typical transmitter according to the invention.

Referring to FIG. 1, the spread spectrum system, in one particular application, provides communication between one or more buoys 10a, 10b, . . . , and an on-shore receiver station complex 14. The buoys may be associated with a vessel 15 or may be fixed in position, and in either case are activated during emergency conditions to provide distress transmissions relayed to the on-shore receiver station complex 14 through one or more satellites 16a, 16b, which preferably are synchronous or geostationary satellites. The distress transmissions may, for example, identify the vessel and provide its position.

The satellite system will herein be assumed to support plural narrow band voice or data channels with the available bandwidth for the satellite being much greater than that of any individual channel. For example, the MARISAT system has been allocated 8 megahertz of bandwidth in the maritime portions of the L-band and supports many voice and data channels which are characterized by 27 kilohertz and 6.25 kilohertz bandwidths respectively. It is also assumed that the satellite contains a linear repeater with no selective filtering in the repeater assembly.

Referring to FIG. 2, a typical satellite system will have its voice and its communications channels 20 distributed across an allocated frequency range. The communications data transmitted through these channels will generally have good signal to noise ratio and hence can be described as "strong and reliable" data signals. These signals are characterized by relatively high power levels and high signal to noise ratios. The spread spectrum system according to the invention provides signals which are characterized by a low peak power in a portion of the frequency range allocated to the satellite. This is indicated by the dashed line 22 in FIG. 2 which represents the lower power spread spectrum power spectrum. The low power level assures negligible interference to existing satellite narrow bandwidth communication so that, with respect to those narrow bandwidth communications, the superimposed spread spectrum signal in the channel has the appearance of low-level noise.

Because, according to the invention, low power levels are employed in connection with the spread spectrum transmitted signal and in order to acquire and recover the spread spectrum signal from the noise which has a comparable or greater power level, the message data is combined with or superimposed on a repeating pseudo-random coded signal. This enables reliable detection of the data as described in detail below. The transmission signal, according to the illustrated embodiment of the invention, consists of a phase modulated carrier signal of selected frequency, modulated by a signal consisting of a pseudo-random code sequence synchronously combined with the synchronization word and data bits.

Referring to FIG. 3A, the repeating message signal structure, according to the illustrated embodiment of the invention, consists of, in sequence, a synchronization word 24, a transmitter identification data word 26, a position data word 28, and a distress code word 30. As noted above, this message is combined with a repeating pseudo-random noise code sequence, designated a code cycle 32, so that each data bit corresponds to a fixed number, for example 5 in the preferred embodiment, of pseudo-random noise code cycles. Each pseudo-random noise code cycle 32 consists of a plurality, N, of code chips 36, each code chip corresponding to a single bit in the pseudo-random code sequence.

Referring to FIG. 4, a typical transmitting element 40, for generating the message structure of FIG. 3A, has a code word generator 42, a synchronization word generator 44, and a data word generator 46 whose respective outputs are combined, here through a modulo 2 summing network 48. Each of the generators 42, 44, 46 comprises a digital shift register 50, 52, 54 respectively and each shift register is clocked from the output of a crystal controlled clock 56 appropriately reduced in frequency, as needed, for the synchronization shift register 52 by divider 58 and for data shift register 54 by dividers 58 and 60. Dividers 58 and 60 may be for example appropriately configured binary counters. The modulo 2 sum of the outputs of generators 42, 44, 46 is applied to a modulator 62. In the illustrated embodiment, modulator 62 is a phase modulator such as a double balanced mixer which uses the output of summing network 48 over line 64 to modulate the output of a crystal controlled oscillator 66 over line 68. The preferably phase modulated output of modulator 62 is applied to a power amplifier 70 which provides its output to a transmitting antenna system 72.

Data entered into the data word generator 46 from an external source is differentially encoded as is well known in the art.

The code generator 42 is configured as is well known in the art to provide a maximal length pseudo-random code over its output lines 74. The synchronization word generator and the data word generator use the shift registers 52 and 54 respectively in a recirculating mode with "zero bits" stored in unused elements of the registers so that after the modulo 2 addition of their outputs, the message signal is properly combined and synchronized.

Figure 5A:
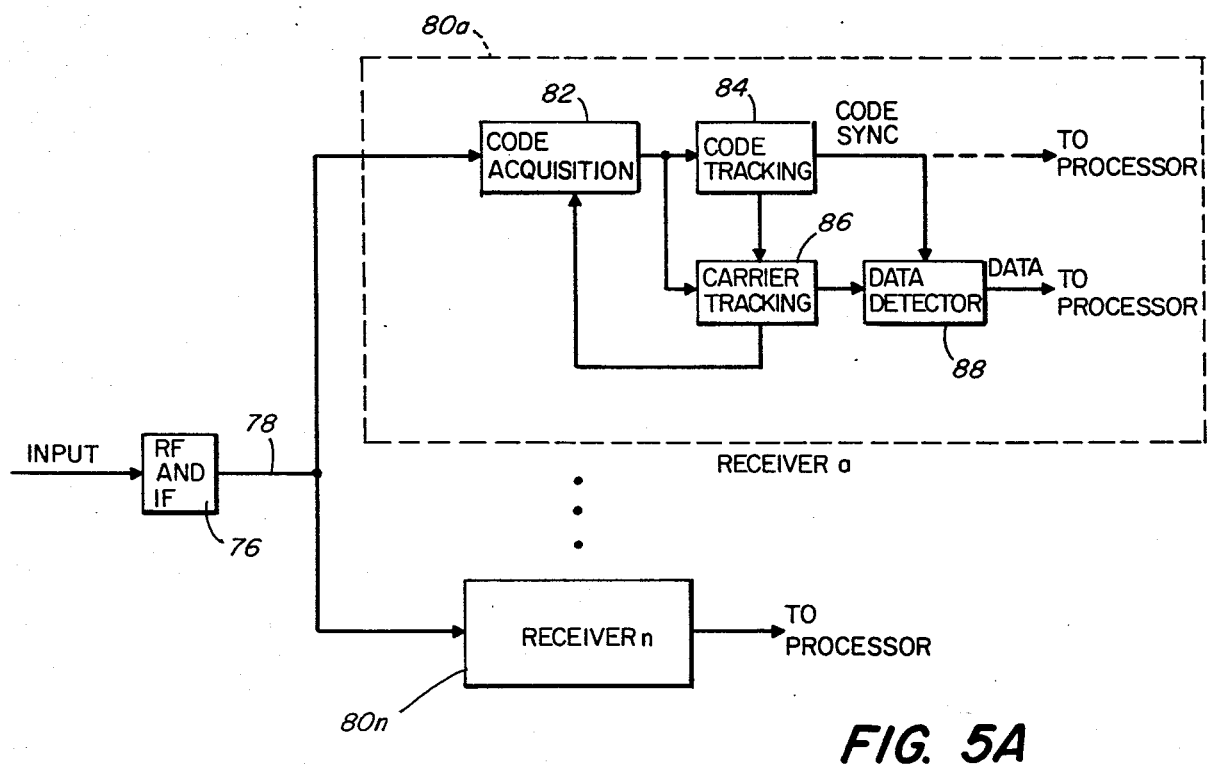
FIG. 5A is a functional schematic block diagram of a portion of a typical receiver structure.

Referring to FIG. 5A, the receiving station comprises an input RF and IF stages 76 which provide, over a line 78, the IF output signal. The IF output signal is processed by each of a plurality of receiver elements 80a, 80b, . . . , 80n. The identical receiver elements each operate in parallel with each other and contain a mixing frequency slightly offset from its neighbor. The mixing frequency of the totality of the receiver elements encompasses the carrier signal frequency employed by the transmitting station and allows, in addition for instabilities in the transmitter crystal oscillator 66. Each receiver element consists of a code acquisition portion 82, a code tracking portion 84, a carrier tracking loop 86, and a data detector 88, functionally depicted in FIG. 5A.

Synchronization of the pseudo-random noise code is obtained first by the code acquisition and code tracking portions of the receiver. According to the invention, this acquisition procedure is carried out incoherently; and once code acquisition is achieved, the code tracking loop is enabled. Next, a unique procedure provides precise carrier tracking and thereafter a Costas loop having a small loop bandwidth, is enabled to maintain a low steady state phase error in the expected high noise operating environment. The code tracking loop is implemented as a delay lock loop or an equivalent circuit, and under appropriate operating conditions tracks the basic code to a small fraction of a pseudo-random code chip duration. The final component of the receiver element is the data detector which performs the necessary integration, symbol and frame synchronization, and clocking functions to reliably decode the message. The detected data consists of the transmitter identification, position, and distress code bits noted earlier.

Figure 5B:
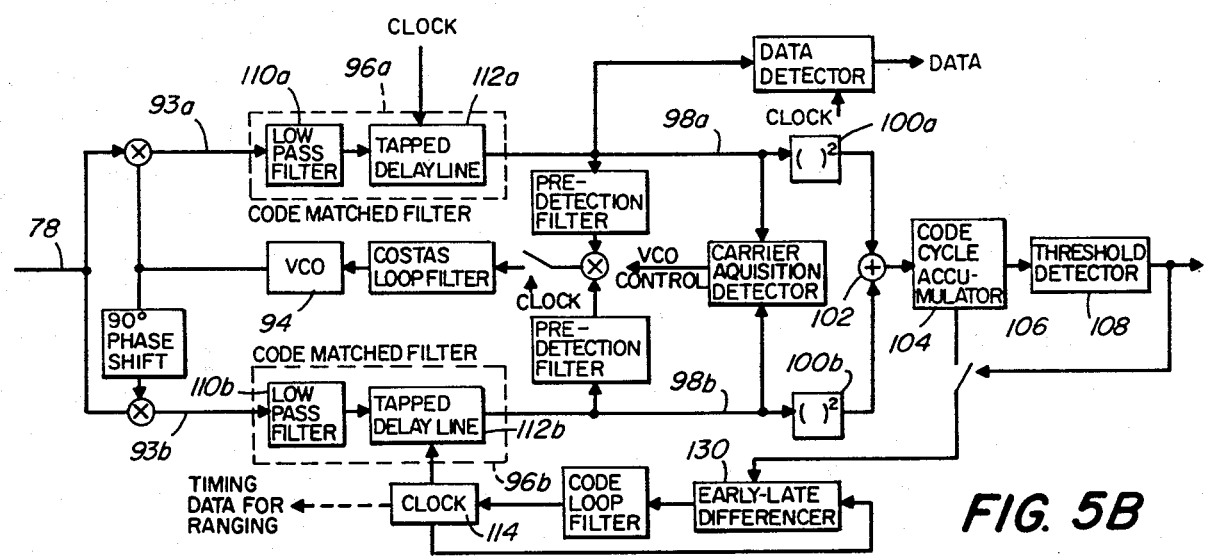
FIG. 5B is a more detailed schematic block diagram of the code and carrier acquisition and tracking portions of a signal receiver according to the invention.

Referring now to FIG. 5B, a more detailed block diagram of the code acquisition and tracking portions of the receiver, the IF input signal over line 78 is divided into its quadrature components over lines 93a, 93b, at a starting frequency set by voltage controlled oscillator 94. The quadrature components are passed through respective code matched filters 96a, 96b, the outputs of which, over lines 98a and 98b, are applied to squaring networks 100a, 100b respectively. The signal output of squaring networks 100 are combined by a summing network 102 which produces the algebraic sum of the input signals. The output of summing network 102 is delivered to a code cycle accumulator 104 whose output over line 106 is provided to a threshold device 108. (The operation of device 108 is described below.) The receiver described thus far comprises the code acquisition portion of the receiver element.

The prior art procedure acquires the pseudo-random code, either by generating a local replica of the code and stepping from one chip position of the received signal to the next until a correlation between the incoming signal and the code is achieved, or by use of short delay matched filters based, for example, on surface acoustic wave devices, or by a combination of these techniques. The prior art technique is thus a very time consuming project. The present invention replaces the prior art approach and employs the code matched filters 96 to perform the correlation. The code matched filters 96 have a low pass filter 110a, 110b matched to the pseudo-random noise chip pulse shape and a tapped analog delay line 112a, 112b, such as a charge transfer device tapped delay line/analog shift register, with the output appropriately weighted and combined to correspond to the pseudo-random noise code. The employment of the code matched filter enables the substantially instantaneous determination of the correlation value corresponding to each chip position and the acquisition time is significantly reduced.

Figure 6A:
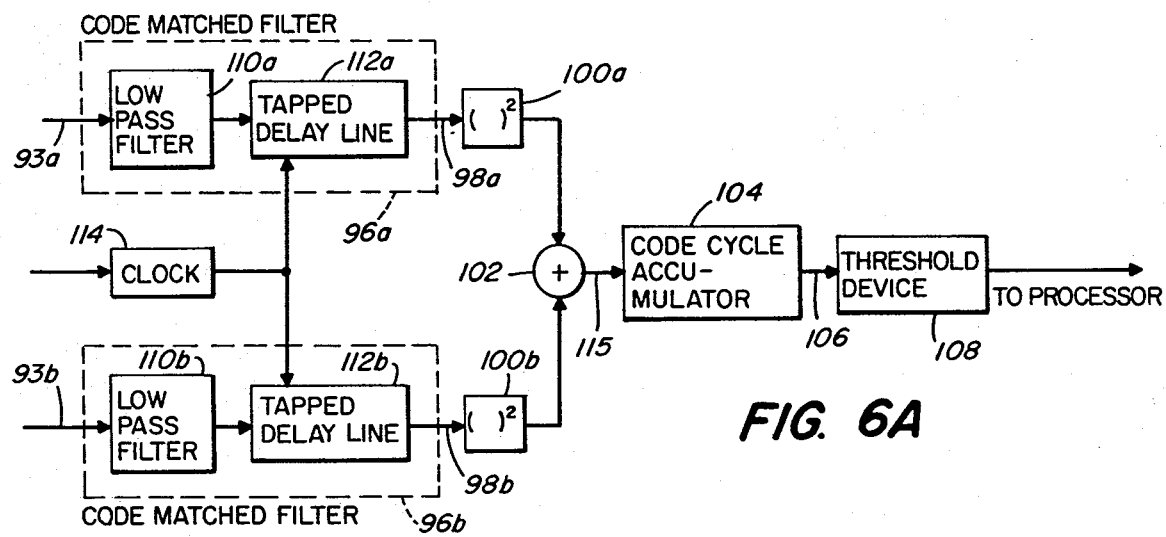
FIG. 6A is a detailed schematic block diagram of the code acquisition portion of the single receiver according to the invention.
Figure 6B:
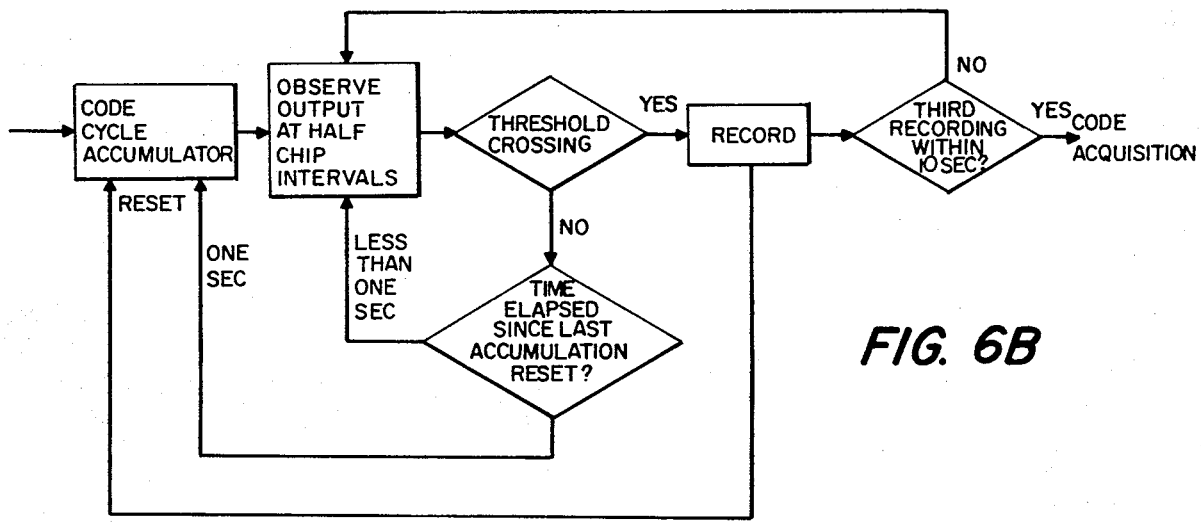
FIG. 6B is a flow chart of the operation of the code acquisition portion of the receiver of FIG. 6A.

Referring to FIG. 6A, which depicts in isolation the code acquisition portion of the receiver element, and to FIG. 6B, which is a flow diagram of the operation of the code acquisition portion of the receiver element, the output of a variable clock 114 is applied to each tapped delay line. The frequency of the clock 114 output is set approximately equal to twice the code chip bit rate. Accordingly, the number of stages in each tapped delay line 96 is twice the number of bits in the pseudo-random code sequence. In this way, two correlation output samples are provided for each pseudo-random code chip, and a sample will be taken within one quarter of a chip cycle of the correlation peak. As will be described later, clock 114 is variable so that it can be exactly frequency and phase synchronized with the transmitter clock.

The output of the respective code matched filters is therefore a sequence of correlation signal values wherein the signal amplitude corresponds to the correlation of the quadrature component to the code sequence. These signal values are squared by squaring networks 100a, 100b, respectively, because the receiver, at this stage of its operation, must incoherently detect and acquire the transmission signal. The summed output over a line 115 is applied to code cycle accumulator 104.

The code accumulator 104 stores the value of each summed output over line 115 twice each code chip time (corresponding to two samples for each code chip). Each such summed output over line 115 is added to the corresponding cumulative value in a recirculating delay device. Thus, if the repeating pseudo-random code sequence has a length of 1023 bits, the code cycle accumulator stores the value of 2046 samples.

Referring now to FIG. 6B, each receiver element is initialized by the resetting all of the registers of the code cycle accumulator. Inputs to the code cycle accumulator are continuously received from the summing network, and according to the preferred embodiment of the invention, the accumulated signal values are observed at times corresponding to one-half of a code chip interval. If the observed value exceeds a preset threshold the time of the threshold crossing is recorded, the accumulator is reset, and the procedure is repeated. If a threshold is not recorded within the selected observation time, say one second, then the accumulator is reset and the procedure repeats. This code acquisition procedure repeats until three time related threshold crossings, within a second selected observation time, say, ten seconds, are recorded. The code is then assumed to be acquired.

In a practical system, however, the clock controlling generation of the code sequence, clock 56, will slowly drift, especially over a multi-second interval, and due to code clock drift, the detected samples will not necessarily be identically spaced from the pseudo-random noise code correlation peak. Because of this uncertainty in the continuing code drift, the carrier acquisition process, as described below, cannot be initiated until the receiver element accurately locks onto the code and synchronizes its local clock 114 to that of the transmitter. Even after code acquisition is achieved, the threshold detector 108 continues to monitor the output of the code cycle accumulator however the threshold itself is reduced. This procedure provides an ongoing verification that the code acquisition is continuing, and insures that the code tracking procedure, to be discussed below, is functioning properly. This procedure also enables the receiver to eventually detect the situation in which code acquisition was precipitated by a false alarm.

Figure 7:
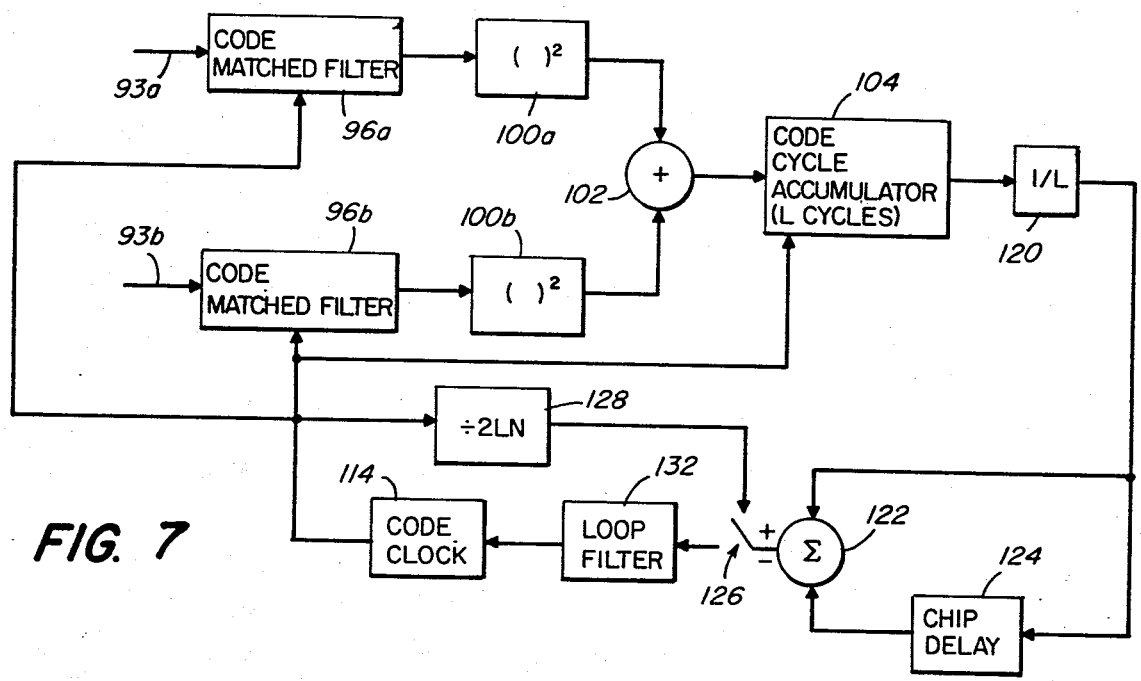
FIG. 7 is a schematic block diagram of the code tracking portion of a receiver according to the invention.

Once the code has been acquired, code lock and tracking is implemented through the equivalent of a delay lock loop. Referring to FIG. 7, non-coherent code tracking is employed because coherent phase lock has not yet been achieved and because of the bi-phase data superimposed on the underlying pseudo-random noise code. Also, post detection accumulation (accumulator 104) is employed prior to updating the local code clock 114 to compensate for signal to noise ratio losses from use of the squaring network. The summing network is required because of the continuing need for incoherent detection.

Referring to FIG. 7, the squared outputs of the code matched filters 96a, 96b are summed and accumulated in the code cycle accumulator 104. In order to provide the needed signal to noise ratio, a plurality of code cycles are accumulated to compensate for the squaring loss noted above. In the preferred embodiment, the number of accumulated cycles, "L", equals 100. The output of the code accumulator is normalized through an attenuating network 120 and is applied to a second summing network 122. The other input to the summing network 122 is the output of attenuator 120 delayed by one code chip interval, through a delay 124. The output of the summing network 122 which equals the difference between its inputs, is sampled once every L code cycles by the pulse controlled switch 126. Switch 126 is clocked once every "2LN" pulse outputs of code clock 114. (The output of code clock 114 is divided by a dividing element 128, by the factor equal to "L" times "2N". The dividing element 128 may be, for example, a multi-stage binary counter appropriately configured to reset after reaching a count equal to the product of "L" and "2N". The configuration just described corresponds to the early-late differencer 130 of FIG. 5B.

The code clock 114 is synchronized to the transmitter clock 56 by passing the sampled output of summation element 122 through a loop filter 132, the output of which controls the frequency and phase of code clock 114. (Initially the sampling time is chosen to correspond to the time of occurrence of the correlation peak.) In a typical system, a reasonable time to "lock" onto the pseudo-random code should be about 5 seconds. At this point in time, code acquisition and code tracking will have been achieved, and the next step in achieving synchronous detection is carrier acquisition.

Carrier acquisition is accomplished, according to the preferred embodiment, through a multi-stage procedure. The prior code acquisition procedure will have already reduced the carrier uncertainty. Thus, if the receiver elements are set 500 Hz. apart, the carrier frequency uncertainty will be approximately plus or minus 250 Hz. During the following carrier acquisition method, that uncertainty is sequentially reduced. In the illustrated embodiment, the uncertainty is first reduced to plus or minus 87.5 Hz., and then to plus or minus 12.5 Hz., both in an open loop fashion. An automatic frequency control (AFC) loop is then enabled which reduces the carrier frequency uncertainty to less than 7.5 Hz.. This falls in the loop bandwidth of a Costas loop (which is well known in the art). The Costas loop can then be enabled so that phase lock can be achieved.

Since the frequency uncertainty, in the illustrated embodiment, at the onset of carrier acquisition is plus or minus 250 Hz., a frequency search over the resulting 500 Hz. band is first implemented. While various techniques can be used in this initial stage, the illustrated procedure employs four frequency steps of 125 Hz. each. Unlike code acquisition, wherein a coherent integration takes place only over a single code cycle, in the illustrated embodiment, the corresponding integration is implemented over five code cycles. This interval corresponds to the duration of each data bit in the message. Thus, in the illustrated embodiment, each data bit corresponds to five complete pseudo-random noise code cycles (and preferably the data bits are encoded using a 5 bit Barker code as is well known in the art).

During carrier acquisition, clock 114 continues to provide the timing necessary for accurately shifting data in the code matched filters 96a, 96b, and the clock 114 output, divided by a factor of 2N, twice the number of chips in a pseudo-random code word, by dividing network 134, is provided to word matched filters 136a, 136b, to control data shifting within a synchronization word matched filter 138 and a data word matched filter 140 of the filters 136. According to the invention, the voltage controlled oscillator 94 is discretely switched in 125 Hz. steps across the frequency range of interest. For each frequency step, a message cycle accumulation of the summed correlation output of the word matched filters is effected, and the frequency step providing the largest summed correlation accumulation is designated as the selected center frequency for the next step in carrier acquisition procedure.

The synchronization word matched filters 138 and data word matched filters 140, each consist of tapped analog delay lines or the equivalent wherein the filter 138 is matched to the synchronization word, here illustrated to be 20 bits long, while the delay line of filter 140 is matched to the data bit which is encoded, in the illustrated embodiment, using a five bit Barker code. (As noted above, Barker codes are well known to those skilled in the art.)

Figure 8A:
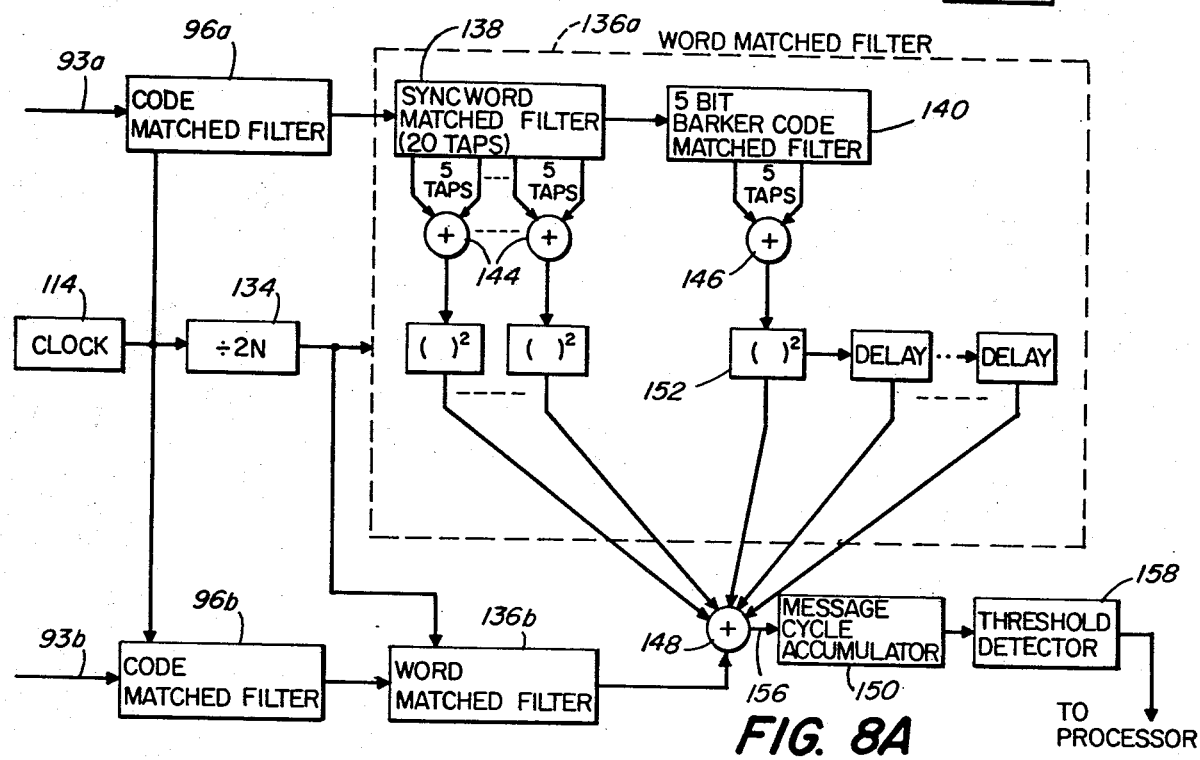
FIG. 8A is a schematic block diagram of the apparatus in the initial stage of carrier acquisition for a receiver according to the invention.

Post detection accumulation now proceeds in a manner similar to that employed in connection with code acquisition. Since the carrier frequency is known to plus or minus about 250 Hz., and since in the preferred embodiment a complete code cycle is assumed to take 1 msec., a coherent integration can take place over five code cycles. Thus, for the 20 bit synchronization word in the illustrated embodiment, there are four summing networks 144 each receiving the inputs from five consecutive taps of the synchronization word matched filter delay line. Correspondingly, the five Barker code bits representing a data bit are summed by summing network 146. The outputs of the summing networks 144, 146 are incoherently detected by squaring the summing network outputs and then summing the total of the squared outputs at summing network 148. The output of summing network 148 is made available to a message cycle accumulator 150 whose, operation corresponds to that of code cycle accumulator 104. As shown in FIG. 8A, the output of the squaring network associated with the data bit coherent detection, squaring network 152, is also connected to a plurality of one data bit delay elements 154, the number of the delays corresponding to the number of data bits in the message. The delay of elements 154 equals the time required to transmit the data bit, and corresponds in the preferred embodiment, to five code cycles.

Figure 8B:
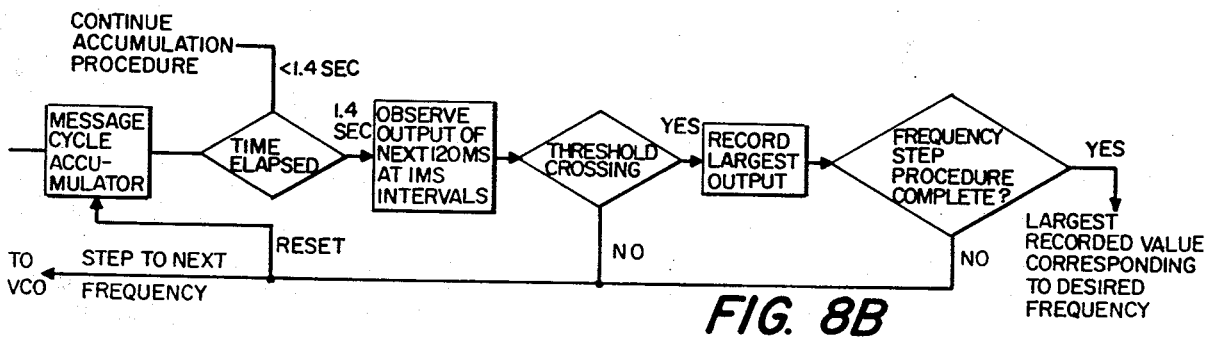
FIG. 8B is a flow chart of the steps employed in the initial stage of carrier acquisition.

The output over a line 156 of summing network 148 thus represents a combination of coherent and incoherent detection for an entire message. The output includes both quadrature components. The output of the summing network 148 is observed by the message cycle accumulator 150 at intervals corresponding to the length of a code cycle and the output at each code cycle interval is recorded in the messsage cycle accumulator. Corresponding message times of successive code cycles are thus accumulated for a selected number of message cycles, eight in the preferred embodiment, and during the last accumulated messsage cycle, the output of the messsage cycle accumulator is observed at the code cycle intervals. If, at this time, any accumulator output exceeds a preselected threshold set by a threshold detector 158, the largest accumulator output is recorded. This procedure is followed for each of the selected frequencies (controlled by the variable voltage controlled oscillator 94) and the recorded outputs are thereafter compared with one another. The frequency corresponding to the largest value of recorded accumulator output is then selected as the frequency closest to the frequency of the transmitted source carrier. The procedure described above is illustrated in the flow chart of FIG. 8B.

Figure 9:
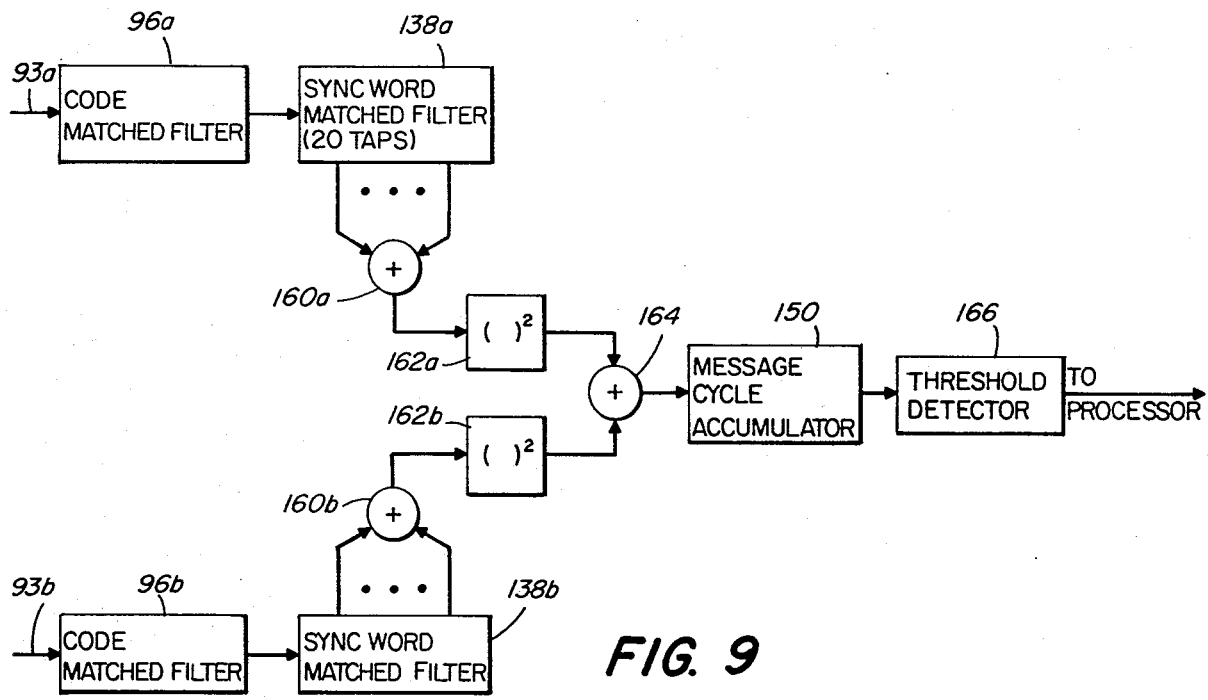
FIG. 9 is a schematic block diagram of the apparatus during a second stage of carrier acquisition for a receiver according to the invention.

In the next or second stage of carrier acquisition, the uncertainty frequency band, now reduced to approximately plus or minus 87.5 Hz., is reduced still further. In the illustrated embodiment, in this second stage of acquisition, the voltage controlled oscillator is stepped in 25 Hz. steps over a frequency range centered around the frequency resulting from the first stage of carrier acquisition and the entire synchronization word is coherently detected. Thus, referring to FIG. 9, and omitting for clarity, the clock structure of FIG. 8A, the outputs of the code matched filters 96a and 96b for each selected frequency, are applied to synchronization word matched filters 138a, 138b. For each selected frequency and for each code cycle, a coherent integration over the 20 data bits forming the illustrated synchronization word is effected and the coherent outputs, provided by summing networks 160a and 160b, are squared by squaring circuits 162a and 162b. The outputs of the squaring circuits are added by summing network 164, and after summation, are observed and stored as described in connection with FIG. 8A in a message cycle accumulator 150. In this embodiment, as noted in connection with FIG. 8A, in order to maintain an acceptable signal to noise ratio, the coherent integrations are performed over a selected number of message cycles, for example, 10 message cycles. Because of the synchronization word correlation properties (a Neuman-Hofman sequence can be used), the correlation peak will cross a preset high threshold with high probability only for that code cycle time corresponding to correlation of the entire word. (The preset threshold is controlled by a threshold detector 166). Thus, the stepped frequency containing the highest output signal, of those which exceed the threshold, is selected as the frequency closest to the transmitter carrier frequency.

Figure 10:
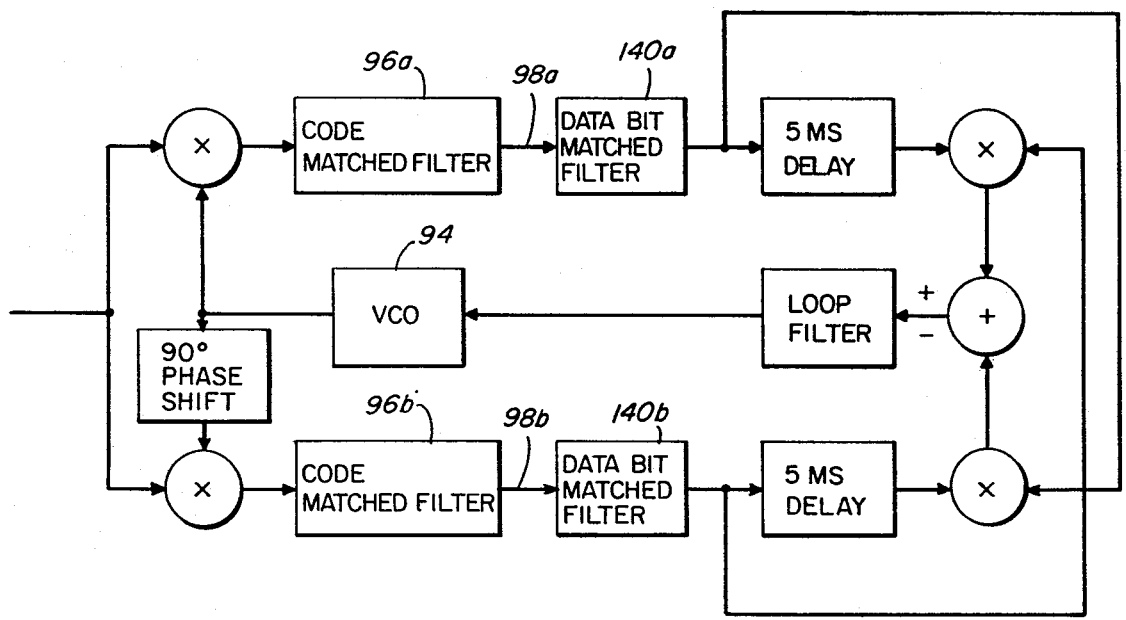
FIG. 10 is a schematic block diagram of the apparatus during the final stage of carrier acquisition for a receiver that is, for implementation of the automatic frequency control configuration according to the invention.

The final stage of the carrier acquisition procedure, prior to enabling a Costas loop, consists of automatic frequency control (AFC) frequency synchronization. The corresponding block diagram (FIG. 10) is analogous to a circuit configuration described and discussed in Cahn et al, "Software Implementation of a PN Spread Spectrum Receiver to Accommodate Dynamics", *IEEE Transaction on Communications*, Volume COM-25, No. 8, August 1977, pps. 832–840, the pertinent portions of which are incorporated herein by reference. To enhance AFC loop "pull in", a first order loop is employed. Furthermore, predetection integration over a full bit duration, corresponding to five code cycles, is employed here to enhance the predetection signal to noise ratio. This is possible however, only by virtue of the previous carrier acquisition stages since proper AFC loop operation results only if the phase change over the predetection integration interval does not exceed 90°. This will be clearly satisfied where the present uncertainty is 40 Hz. and the integration interval is, for example 5 milliseconds, corresponding to 5 complete pseudo-random code words. The resulting frequency acquisition from the AFC "pull in", falls within the 7.5 Hz. Costas loop bandwidth which is considered below.

The open loop method described above reduces the frequency uncertainty to a manageable level and also provides data word synchronization which enables the AFC loop to perform a predetection integration over a full data bit duration, rather than only over a single code cycle. The resulting predetection signal to noise ratio enhancement permits satisfactory AFC operation and also allows the Costas loop, discussed below, to operate in a satisfactory manner.

Figure 11:
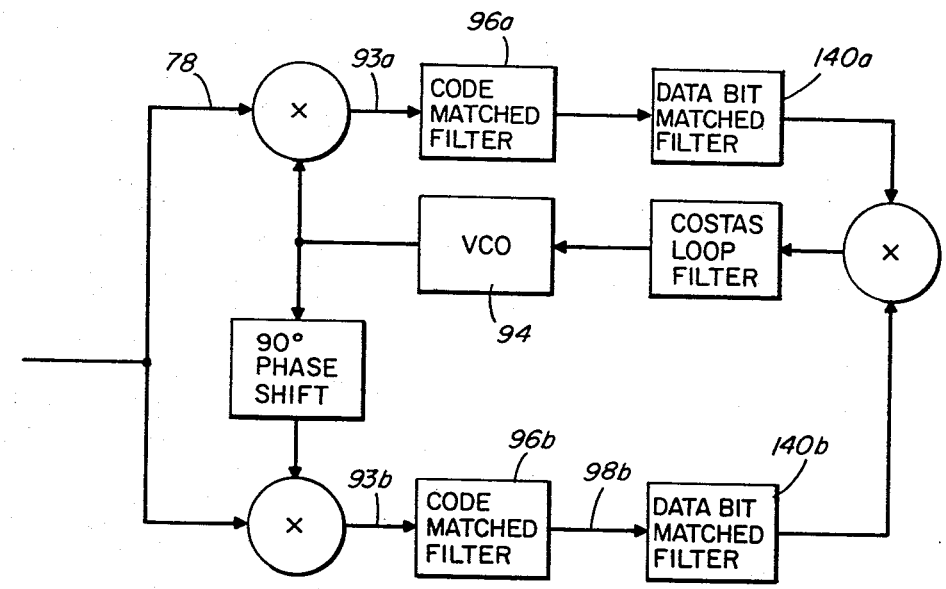
FIG. 11 is a schematic block diagram of the Costas loop feedback configuration for tracking frequency and phase in a receiver according to the invention.

Once the AFC loop achieves lock, the corresponding control voltage is disabled and the Costas loop (FIG. 11) is enabled. The predetection integration is again over the full data bit (5 code cycles in the illustrated embodiment) with the loop filter now being of second order. Since word synchronization has already been attained, each data bit integration (over 5 code cycles) can be matched to the 5 bit Barker coded data bit (used in the preferred embodiment) or to appropriate portions of the synchronization word for greater system reliability. The Costas loop is well known in the art and after Costas loop lock is achieved, coherent data detection can take place. (See the December 1956 issue of the IRE Journal, Volume 44, pps. 1713–1718 for a more complete description of Costas loop operation requirements.)

Figure 12:
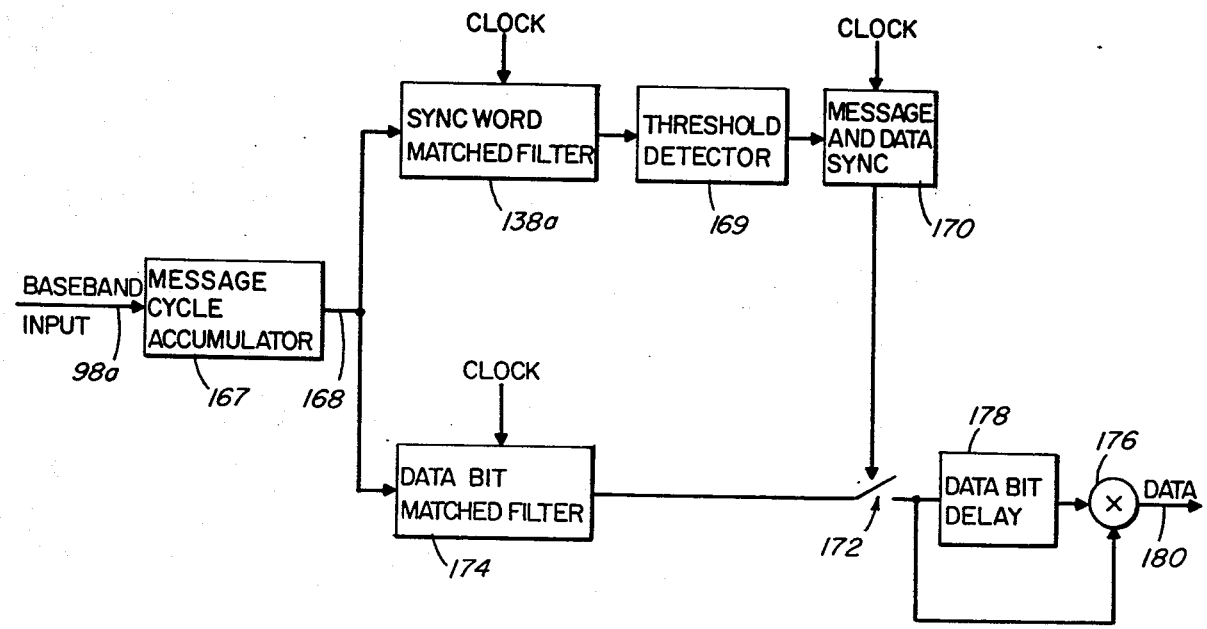
FIG. 12 is a schematic block diagram of the data processing detector portion of the receiver according to the invention.

Referring to FIG. 12, once Costas loop lock is achieved, coherent data detection can be accomplished. The data detection structure includes a message cycle accumulator 167 which receives the output of the in-phase portion of the receiver matched filter 96a output over line 98a. This is a coherent baseband signal input to the data detector. The signal to noise ratio is built up to an acceptable level by passing the baseband signal through the message cycle accumulator 167 for a number of message intervals. This is easily accomplished since the message repeats numerous times before the transmitter shuts down. This procedure allows for a significant reduction in the data bit duration per message, and the requirements of the Costas loop are also reduced.

The accumulator output over lines 168 is used for two purposes. First, the output is directed to synchronization word matched filter 138a, and an appropriate threshold detection element 169, connected to the output of the synchronization word matched filter, provides not only frame synchronization but is connected to a message and data synchronization element 170 to provide the bit and word synchronization required for the data detection which follows. Thus, upon the detection of the synchronization word by threshold detector 169, the message and data synchronization element 170 provides for periodic closing of a switch 172.

The output of message cycle accumulator 167 is also directed along line 168 to a data bit matched filter 174. The output of the data matched filter is sampled by the message and data synchronization element 170 through switch 172. The output is directed to both a multiplier network 176 and to a one data bit delay element 178 so that the data output over a line 180 does not contain the differential encoding of the transmitted data stream. The 180° phase ambiguity resulting from use of the Costas loop is thus resolved.

While the spread spectrum communication signal has been described here in connection with a particular application and in a particular embodiment, the general concept of the system, including (a) the use of code matched filters based on charge transfer devices or their equivalent in place of the prior art technique of generating a repeating replica of the pseudo-random code sequence at the receiver and (b) the implementation of code acquisition and lock at very low signal-to-noise ratios prior to carrier acquisition, provides a system having excellent capability and reliability. The low cost transmitters of the invention may be provided at a plurality of locations, and existing communications channels, dedicated for other purposes, may be used without interfering with the normal operation of the channel. The sophisticated receiving stations can be configured to "pull" the intelligence (i.e. data) incorporated into the transmitted signal from the noise. In the preferred embodiment of the invention, the transmitter transmission is periodically terminated and restarted to provide different synchronization timing so that multiple systems even if they operate upon substantially the same frequency will in a relatively short time, each be acquired and the data understood.

Other embodiments of the invention, including additions, subtractions, deletions and other modifications of the preferred disclosed embodiment of the invention will be obvious to those skilled in the art and are within the scope of the following claims.

What is claimed is:

1. A spread spectrum communications system for use with a communications network having a wide bandwidth linear repeater channel comprising
    a transmitting element having
        means for repetitively generating a plural binary digit message signal for a sequence of binary input data, different input data resulting in different message signals and
        modulation means for generating from said message signal a spread spectrum transmission signal, said transmission signal being adapted to be transmitted as a pseudo-noise signal simultaneously with a plurality of nonspread spectrum communications signals over said wide bandwidth repeater channel, said channel being dedicated to receiving and retransmitting said plurality of nonspread spectrum communication signals unrelated to said spread spectrum signal, and
    a receiver station for receiving said spread spectrum transmission signal, as retransmitted by said repeater channel, and for reconstructing said input data from said received retransmitted transmission signal.

2. The spread spectrum system of claim 1 wherein said transmitting element comprises means adapted to generate a spread spectrum signal for transmission through a satellite communications system, said satellite system having said wide bandwidth repeater channel.

3. The spread spectrum system of claim 1 wherein said transmitting element generating means comprises
    means for repeatedly generating at a first bit rate a selected pseudo-random code binary signal having a selected length, said first bit rate and said selected length defining a code word cycle time,
    means for generating at a second bit rate a synchronization identification word binary signal;
    means for generating at a third bit rate said sequence of binary input data,
    said first bit rate divided by said selected length being an integer multiple of said second bit rate and of said third bit rate, and
    means for combining said code signal, said synchronization signal and said data sequence to form a repeating binary message signal, and
    said modulating means comprises means for modulating a constant frequency carrier wave with said message signal to generate said spread spectrum transmission signal.

4. The spread spectrum system of claim 3 wherein
    said synchronization signal generating means comprises a circulating shift register containing at least a selected synchronization word,
    said data signal generating means comprises a second circulating shift register containing at least a data information sequence,
    said combining means comprises a modulo two adder, and
    said system further comprises means for synchronizing operation of said code signal generating means, said synchronization signal generating means, and said data signal generating means.

5. The spread spectrum system of claim 1 wherein
    said message signal comprises a synchronization word and a sequence of data message bits, each combined with a repeating pseudo-random code sequence, and
    said receiver station comprises
    at least one receiver element, each element comprising
        means for forming first and second quadrature component signals of said received signal at a selected carrier frequency,
        a first and a second pseudo-random code matched filter, each filter being responsive respectively to said first and second component signals and each filter being matched to the selected pseudo-random code signal, and
        incoherent detection means responsive to outputs of said filters for providing an output signal representing the degree of correlation of the received signal and the selected pseudo-random code signal.

6. In a spread spectrum system having a carrier signal angle modulated by a message to be transmitted, and wherein the transmitted message comprises plural message bits synchronously combined with a repeating pseudorandom code sequence, a receiving method comprising the steps of
    non-coherently acquiring and tracking said pseudo-random code sequence by employing non-coherent, recursive integration, and
    thereafter acquiring and tracking the transmitted carrier frequency and phase.

7. In a spread spectrum system having a carrier signal angle modulated by a message to be transmitted, and wherein the transmitted message comprises plural message bits synchronously combined with a repeating pseudorandom code sequence, a receiving method comprising the steps of
    providing a plurality of receiving elements operating in substantially non-overlapping frequency ranges,
    non-coherently acquiring and tracking said pseudo-random code sequence using one of said receiving elements, and
    thereafter acquiring and tracking the transmitted carrier frequency and phase using said one of said receiving elements.

8. A spread spectrum communication system for use with a communications network having a wide bandwidth repeater channel, comprising
    a transmitting element having
        means for repetitively generating a binary message signal from a sequence of binary input data, said message signal comprising a synchronization word and a sequence of data message bits, each combined with a repeating pseudorandom code sequence, and modulation means for generating from said message signal a spread spectrum transmission signal, said transmission signal being adapted to be transmitted as a pseudo-noise signal simultaneously with a plurality of communications signals over said wide bandwidth repeater channel, said channel being dedicated to receiving and retransmitting said plurality of communications signals, said communications signals being unrelated to said spread spectrum signal, and a receiver station for receiving said spread spectrum transmission signal, as retransmitted by said repeater channel, and for reconstructing said input data from said received retransmitted transmission signal, said receiver station comprising at least one receiver element, each element comprising means for forming first and second quadrature component signals of said received signal at a selected carrier frequency, a first and a second pseudorandom code matched filter, each filter being responsive respectively to said first and second component signals and each filter being matched to the selected pseudorandom code signal, and incoherent detection means responsive to outputs of said filters for providing an output signal representing the degree of correlation of the received signal and the selected pseudorandom code signal, said detection means comprising a code cycle accumulator for separately accumulating the sum of the squared values of the outputs of said code matched filters at each of a plurality of periodically occurring times, and means for resetting the stored contents of said accumulator in response to the occurrence of the first of a selected sampling time or an accumulated stored contents greater than a first threshold value.

9. The spread spectrum system of claim 8 wherein said periodically occurring times correspond to not more than one-half the time duration between pseudorandom code bit occurrences.

10. A spread spectrum communication system for use in a communications network having a wide bandwidth repeater channel, comprising a transmitting element having means for repetitively generating a binary message signal from a sequence of binary input data, said message signal comprising a synchronization word and a sequence of data message bits, each combined with a repeating pseudorandom code sequence, and modulation means for generating from said message signal a spread spectrum transmission signal, said transmission signal being adapted to be transmitted as a pseudo-noise signal simultaneously with a plurality of communications signals over said wide bandwidth repeater channel, said channel being dedicated to receiving and retransmitting said plurality of communications signals, said communications signals being unrelated to said spread spectrum signal, and a receiver station for receiving said spread spectrum transmission signal, as retransmitted by said repeater channel, and for reconstructing said input data from said received retransmitted transmission signal, said receiver station comprising at least one receiver element, each element comprising means for forming first and second quadrature component signals of said received signal at a selected carrier frequency, a first and second pseudorandom code matched filter, each filter being responsive respectively to said first and second component signals and each filter being matched to the selected pseudorandom code signal, and incoherent detection means responsive to outputs of said filters for providing an output signal representing the degree of correlation of the received signal and the selected pseudorandom code signal, and each said code matched filter comprising a low pass filter matched substantially to the shape of each pseudorandom code bit signal in the received signal, a tapped analog delay line charge transfer device responsive to said low pass filter output and having a number of equally time-spaced output lines at least equal to twice the number of bits in each pseudorandom code sequence, said delay line being responsive to a clock rate corresponding to at least twice the bit rate associated with generation of said pseudorandom code, and means for weighting said tapped outputs according to said selected pseudorandom sequence for providing output signals representing the degree of correlation of the selected pseudorandom sequence and the received signal.

11. The spread spectrum system of claim 10 wherein said detection means comprises a code cycle accumulator for separately accumulating the sum of the squared values of the outputs of said code matched filters at each of a plurality of periodically occurring times corresponding to a code sequence, means for resetting the stored contents of said accumulator in response to the occurrence of the first of a selected sampling time and an accumulated stored contents greater than a first threshold, and means responsive to said accumulator output for selecting a repeating clock pulse time position corresponding to a repeating accumulator output greater than said first threshold and synchronized to a detected pseudo-random code modulated received signal, a variable source of first clock signals, means for generating a clock update signal, said generating means comprising means for sampling the output of the accumulator at plural clock times centered around said repeating clock pulse for providing a difference output signal equal to the difference of each two sampled accumulator outputs, and means for filtering said difference output, said variable clock source being responsive to said filtered difference output for varying the frequency of said variable source, and means for applying said clock source output for controlling timing and sampling of said tapped delay line.

12. A spread spectrum communication system for use with a communications network having a wide bandwidth repeater channel, comprising
a transmitting element having
means for repetitively generating a binary message signal from a sequence of binary input data, said message signal comprising a synchronization word and a sequence of data message bits, each combined with a repeating pseudorandom code sequence, and
modulation means for generating from said message signal a spread spectrum transmission signal, said transmission signal being adapted to be transmitted as a pseudo-noise signal simultaneously with a plurality of communication signals over said wide bandwidth repeater channel, said channel being dedicated to receiving and retransmitting said plurality of communications signals, said communications signals being unrelated to said spread spectrum signal, and
a receiver station for receiving said spread spectrum transmission signal, as retransmitted by said repeater channel, and for reconstructing said input data from said received retransmitted transmission signal,
said receiver station comprising
at least one receiver element, each element comprising
means for forming first and second quadrature component signals of said received signal at a selected carrier frequency,
a first and second pseudorandom code matched filter, each filter being responsive respectively to said first and second component signals and each filter being matched to the selected pseudorandom code signal,
incoherent detection means responsive to outputs of said filters for providing an output signal representing the degree of correlation of the received signal and the selected pseudorandom code signal,
a first and a second synchronization word matched filter responsive respectively to the first and second code matched filter outputs,
a first and a second data word matched filter responsive respectively to the first and second code matched filter outputs, and
means responsive to said code and data word matched filter outputs for accurately determining the frequency of said transmission signal carrier.

13. The spread spectrum system of claim 12 wherein said word matched filters comprise
means for coherently detecting each data word and plural segments of a synchronization word, and
means for incoherently combining said coherently detected words and segments for providing a signal output corresponding to the closeness of the quadrature mixing frequency to the received carrier frequency.

14. The spread spectrum system of claim 12 further comprising
a variable frequency carrier source for generating said quadrature components,
first and second message portion matched filters responsive to selected portions of the message signal,
said filter output responsive means further including means responsive to said message portion matched filters for controlling an automatic frequency control loop filter for more precisely acquiring said carrier source in frequency with said received signal, and
means responsive to said message portion matched filters for controlling a Costas loop filter for locking said carrier source in phase and frequency with said received signal.

15. A spread spectrum communication system for use with a communication network having a wide bandwidth repeater channel, comprising
a transmitting element having
means for repetitively generating a binary message signal from a sequence of binary input data, said message signal comprising a synchronization word and a sequence of data message bits, each combined with a repeating pseudorandom code sequence, and
modulation means for generating from said message signal a spread spectrum transmission signal, said transmission signal being adapted to be transmitted as a pseudo-noise signal simultaneously with a plurality of communication signals over said wide bandwidth repeater channel, said channel being dedicated to receiving and retransmitting said plurality of communications signals, said communications signals being unrelated to said spread spectrum signal, and
a receiver station for receiving said spread spectrum transmission signal, as retransmitted by said repeater channel, and for reconstructing said input data from said received retransmitted transmission signal,
said receiver station comprising
at least one receiver element, each element comprising
means for forming first and second quadrature component signals of said received signal at a selected carrier frequency,
a first and second pseudorandom code matched filter, each filter being responsive respectively to said first and second component signals and each filter being matched to the selected pseudorandom code signal,
incoherent detection means responsive to outputs of said filters for providing an output signal representing the degree of correlation of the received signal and the selected pseudorandom code signal,
means for coherently detecting at each of a plurality of first frequencies, a plurality of short sequences of said message signal synchronization and data words and combining and accumulating using incoherent detection the coherent outputs at each first frequency,
means for selecting from said accumulation of incoherently combined outputs a selected first frequency,
means for coherently detecting up to an entire message at each of a plurality of closely spaced second frequencies, said second frequencies being more closely spaced than said first frequencies and being centered around said selected first frequency, and for combining and accumulating the coherent outputs for each said second frequencies, and means for selecting from said accumulation of second coherent outputs a selected second frequency, said selected first and second selected frequencies being increasingly accurate approximations of the transmission signal carrier frequency.

16. A spread spectrum communication system for use with a communications network having a wide bandwidth repeater channel, comprising a transmitting element having means for repetitively generating a binary message signal from a sequence of binary input data, said message signal comprising a synchronization word and a sequence of data message bits, each combined with a repeating pseudorandom code sequence, and modulation means for generating from said message signal a spread spectrum transmission signal, said transmission signal being adapted to be transmitted as a pseudo-noise signal simultaneously with a plurality of communications signals over said wide bandwidth repeater channel, said channel being dedicated to receiving and retransmitting said plurality of communications signals, said communications signals being unrelated to said spread spectrum signal, and a receiver station for receiving said spread spectrum transmission signal, as retransmitted by said repeater channel, and for reconstructing said input data from said received retransmitted transmission signal, said receiver station comprising at least one receiver element, each element comprising means for forming first and second quadrature component signals of said received signal at a selected carrier frequency, a first and second pseudorandom code matched filter, each filter being responsive respectively to said first and second component signals and each filter being matched to the selected pseudorandom code signal, incoherent detection means responsive to outputs of said filters for providing an output signal representing the degree of correlation of the received signal and the selected pseudorandom code signal, a message cycle accumulation means responsive to said code, matched filter for repetitively accumulating said message data signals, synchronization word matched filter means responsive to said accumulator for providing a synchronization word output signal, controlled variable clock means responsive to said synchronization word output signal for providing message data clock synchronization signals, a data word matched filter responsive to said message accumulator for providing a data output signal, and means responsive to said message data clock synchronization signals and said data output signals for providing output message data.

17. A spread spectrum communication system for use with a communications network having a wide bandwidth repeater channel, comprising a transmitting element having means for repetitively generating a binary message signal from a sequence of binary input data, said message signal comprising a synchronization word and a sequence of data message bits, each combined with a repeating pseudorandom code sequence, and modulation means for generating from said message signal a spread spectrum transmission signal, said transmission signal being adapted to be transmitted as a pseudo-noise signal simultaneously with a plurality of communications signals over said wide bandwidth repeater channel, said channel being dedicated to receiving and retransmitting said plurality of communications signals, said communications signals being unrelated to said spread spectrum signal, and a receiver station for receiving said spread spectrum transmission signal, as retransmitted by said repeater channel, and for reconstructing said input data from said received retransmitted transmission signal, said receiver station comprising a plurality of substantially indentical receiver elements, each element comprising means for forming first and second quadrature component signals of said received signal at a selected carrier frequency, a first and a second pseudorandom code matched filter, each filter being responsive respectively to said first and second component signals and each filter being matched to the selected pseudorandom code signal, incoherent detection means responsive to outputs of said filters for providing an output signal representing the degree of correlation of the received signal and the selected pseudorandom code signal, a voltage controlled carrier source for forming said quadrature components, and each source, prior to identifying a message, having a different carrier frequency output.

18. In a spread spectrum communications system wherein the transmitted message comprises plural message bits synchronously combined with a repeating pseudorandom code sequence, a receiver station comprising at least one receiver element, each element comprising means for forming first and second quadrature component signals of a received signal at a selected frequency, and a first and a second pseudorandom code matched filter, each filter being responsive respectively to said first and second component signals, and each filter being matched to the selected pseudorandom code signal, each said code matched filter having a low pass filter matched substantially to the shape of each pseudorandom code bit received signal, and a tapped analog delay line responsive to said low pass filter output and having a number of equally time-spaced output lines at least equal to twice the number of bits in each pseudorandom code sequence, and means for weighting said tapped outputs according to said selected pseudorandom sequence for providing output signals representing the correlation of the selected pseudorandom code sequence and the received signal, and detection means responsive to outputs of the filters for providing a data output signal representing said message.

19. In a spread spectrum communications system having a carrier signal angle modulated by a message to be transmitted, and wherein the transmitted message comprises plural message bits synchronously combined with a repeating pseudorandom code sequence, a receiver station comprising at least one receiver element, each element comprising means for forming first and second quadrature component signals of a received signal at a selected frequency, and a first and a second pseudorandom code matched filter, each filter being responsive respectively to said first and second component signals, and each filter being matched to the selected pseudorandom code signal, and detection means responsive to outputs of the filters for providing a data output signal representing said message said detection means having means for non-coherently acquiring and tracking said pseudorandom code sequence, and means for thereafter acquiring and tracking said carrier frequency and phase.

20. In a spread spectrum communications system wherein the transmitted message comprises plural message bits synchronously combined with a repeating pseudorandom code sequence, a receiver station comprising a plurality of substantially identical receiver elements, each element comprising means for forming first and second quadrature component signals of a received signal at a selected frequency, a first and a second pseudorandom code matched filter, each filter being responsive respectively to said first and second component signals, and each filter being matched to the selected pseudorandom code signal, a variable frequency carrier source for forming said quadrature components, and detection means responsive to outputs of the filters for providing a data output signal representing said message, said sources operating in non-overlapping frequency ranges.

21. In a spread spectrum system having a carrier signal angle modulated by a message to be transmitted, and wherein the transmitted message comprises plural message bits synchronously combined with a repeating pseudorandom code sequence, the receiving method comprising the steps of forming first and second quadrature component signals of the received signal at at least one selected carrier frequency, for each pair of quadrature signals, passing each quadrature component through a pseudorandom code matched filter, each filter being matched to the selected pseudorandom code signal, and processing the filter outputs to provide data output signals representing the message, acquiring and tracking the pseudorandom code signal, coherently detecting, at each of a plurality of first frequencies a plurality of short sequences of said message signal and accumulating the incoherently summed outputs at each first frequency as a function of time, selecting from said accumulation of incoherently summed outputs a selected first frequency, coherently detecting up to an entire message at each of a plurality of closely spaced second frequencies, said second frequencies being more closely spaced than said first frequencies and being centered around said selected first frequency, combining and accumulating the coherent outputs at said second frequencies, and selecting from said accumulation of second coherent outputs a selected second frequency, said selected first and second frequencies being increasingly accurate approximations of the transmission signal carrier frequency.

22. The method of claim 21 further comprising the steps of activating an automatic frequency control loop for a more precise selected carrier frequency than achieved by said first and second selected frequencies, and thereafter activating a Costas loop filter for locking a voltage controlled oscillator in phase and frequency with said received carrier frequency.

23. In a spread spectrum system wherein the transmitted message comprises plural message bits synchronously combined with a repeating pseudorandom code sequence, the receiving method comprising the steps of forming first and second quadrature component signals of the received signal at at least one selected carrier frequency, for each pair of quadrature signals, passing each quadrature component through a pseudorandom code matched filter, each filter being matched to the selected pseudorandom code signal, and processing the filter outputs to provide data output signals representing the message, non-coherently acquiring and tracking said pseudorandom code sequence, and thereafter acquiring and tracking the transmitted carrier frequency and phase.

* * * * *

UNITED STATES PATENT AND TRADEMARK OFFICE
CERTIFICATE OF CORRECTION

PATENT NO. : 4,291,409

DATED : September 22, 1981

INVENTOR(S) : Aaron Weinberg et al

It is certified that error appears in the above-identified patent and that said Letters Patent are hereby corrected as shown below:

Column 3, line 53, "signal" should be --signals--.

Column 10, line 55, "messsage" should be --message--.

Column 10, line 59, "messsage" should be --message--.

Column 10, line 60, "messsage" should be --message--.

Claim 15, column 18, line 14, "communication" should be --communications--.

Claim 16, column 19, line 51, "code, matched" should be --code matched--.

Signed and Sealed this

Twenty-ninth Day of December 1981

[SEAL]

Attest:

Attesting Officer

GERALD J. MOSSINGHOFF

Commissioner of Patents and Trademarks